US009359823B2

(12) United States Patent
Samuel

(10) Patent No.: US 9,359,823 B2
(45) Date of Patent: Jun. 7, 2016

(54) SYSTEMS AND METHODS OF ADJUSTING WEIGHT ON BIT AND BALANCING PHASE

(71) Applicant: Halliburton Energy Services, Inc., Houston, TX (US)

(72) Inventor: Robello Samuel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 288 days.

(21) Appl. No.: 14/131,727

(22) PCT Filed: Dec. 28, 2012

(86) PCT No.: PCT/US2012/071950
§ 371 (c)(1),
(2) Date: Jan. 9, 2014

(87) PCT Pub. No.: WO2014/105034
PCT Pub. Date: Jul. 3, 2014

(65) Prior Publication Data
US 2015/0322767 A1 Nov. 12, 2015

(51) Int. Cl.
E21B 7/28 (2006.01)
E21B 44/04 (2006.01)
E21B 10/26 (2006.01)
E21B 4/18 (2006.01)
E21B 17/07 (2006.01)

(52) U.S. Cl.
CPC . *E21B 10/26* (2013.01); *E21B 4/18* (2013.01); *E21B 7/28* (2013.01); *E21B 17/07* (2013.01); *E21B 44/04* (2013.01)

(58) Field of Classification Search
CPC ............. E21B 10/26; E21B 7/28; E21B 4/18; E21B 44/04; E21B 17/07
See application file for complete search history.

(56) References Cited

U.S. PATENT DOCUMENTS

| 6,863,137 | B2 | 3/2005 | Terry et al. |
| 7,316,277 | B2 | 1/2008 | Jeffryes |
| 2005/0211470 | A1 | 9/2005 | Jeffryes |
| 2010/0139981 | A1 | 6/2010 | Meister et al. |
| 2010/0193248 | A1 | 8/2010 | Radford et al. |

FOREIGN PATENT DOCUMENTS

WO 2014105034 A1 7/2014

OTHER PUBLICATIONS

International Search Report and Written Opinion for PCT/US2012/71950 dated Nov. 25, 2013.

*Primary Examiner* — David Andrews
(74) *Attorney, Agent, or Firm* — McDermott Will & Emery LLP; Alan Bryson

(57) ABSTRACT

Disclosed are systems and methods of balancing weight distribution between downhole cutting tools. One system includes a drill bit arranged at a distal end of the bottom-hole assembly, a first sensor sub arranged proximate to the drill bit and configured to monitor one or more operational parameters corresponding to the drill bit, a reamer axially-offset from the drill bit on the bottom-hole assembly, a second sensor sub arranged proximate to the reamer and configured to monitor one or more operational parameters of the reamer, and a communications module communicably coupled to the first and second sensor subs and configured to communicate one or more corrective action signals when the one or more operational parameters of the drill bit and the reamer surpass a predetermined operating threshold.

17 Claims, 3 Drawing Sheets

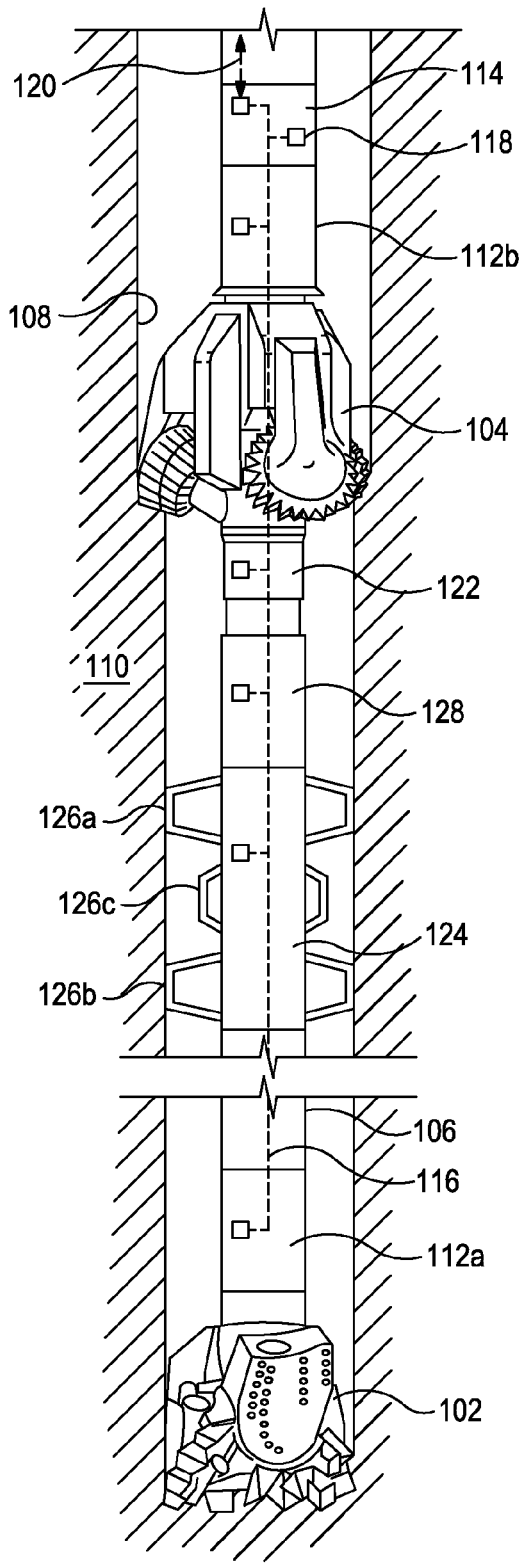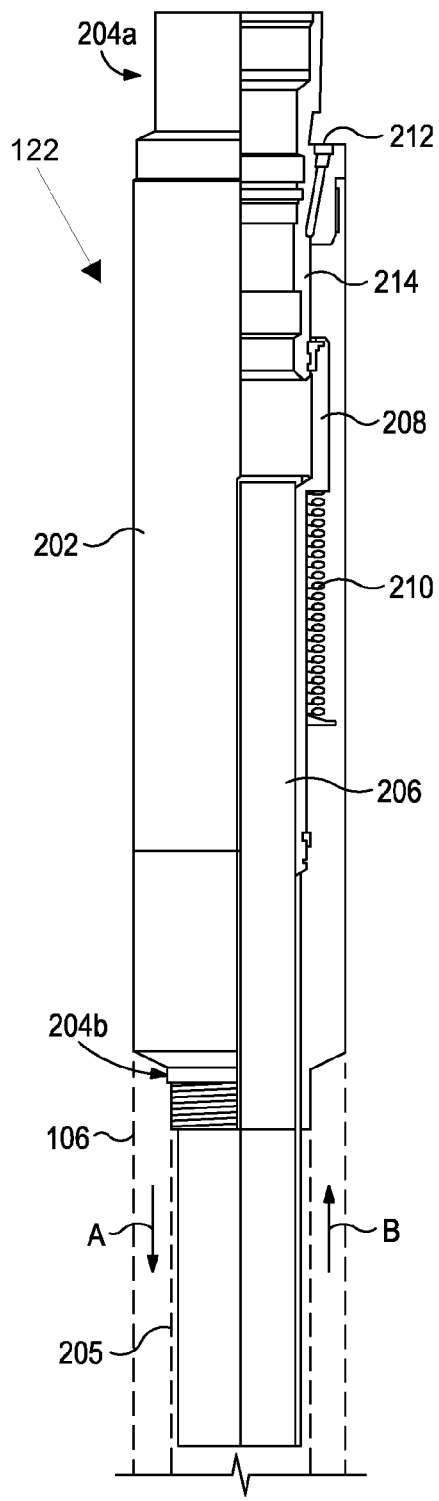
FIG. 1
FIG. 2

SYSTEMS AND METHODS OF ADJUSTING WEIGHT ON BIT AND BALANCING PHASE

BACKGROUND

The present disclosure relates to drilling wellbores in subterranean formations and, more particularly, to systems and methods of balancing weight and hydraulic energy distribution between individual downhole cutting tools.

Wellbores are formed in subterranean formations for various purposes including, for example, the extraction of oil and gas and the extraction of geothermal heat. Such wellbores are typically formed using one or more drill bits, such as fixed-cutter bits (i.e., "drag" bits), rolling-cutter bits (i.e., "rock" bits), diamond-impregnated bits, and hybrid bits, which may include, for example, both fixed cutters and rolling cutters. The drill bit is coupled either directly or indirectly to an end of a drill string or work string, which encompasses a series of elongated tubular segments connected end-to-end that extends into the wellbore from the surface. Various tools and components, including the drill bit, are often arranged or otherwise coupled at the distal end of the drill string at the bottom of the wellbore. This assembly of tools and components is commonly referred to as a "bottom hole assembly" (BHA).

In order to form the wellbore, the drill bit is rotated and its associated cutters or abrasive structures cut, crush, shear, and/or abrade away the formation materials, thereby facilitating the advancement of the drill bit into the subterranean formation. In some cases, the drill bit is rotated within the wellbore by rotating the drill string from the surface while a fluid, such as drilling fluid, is pumped from the surface to the drill bit. The drilling fluid exits the drill string at the drill bit via one or more nozzles arranged therein and may serve to cool the drill bit and flush drilling particulates back to the surface via the annulus defined between the drill string and the exposed surface of the wellbore. In other cases, however, the drill bit may be rotated by coupling the drill bit to a downhole motor (e.g., mud motor) also coupled to the drill string and disposed relatively proximate to the drill bit. The drilling fluid pumped from the surface may power the downhole motor to rotate the drill bit and subsequently exit out of the drill bit nozzles and circulate back up to the surface via the annulus.

To enlarge the diameter of the wellbore, a "reamer" device (also referred to as a "hole opening device" or a "hole opener") may be used in conjunction with the drill bit as part of the BHA. The reamer is typically axially-offset and uphole from the drill bit along the length of the BHA. In operation, the drill bit operates as a pilot bit to form a pilot bore in the subterranean formation, and the reamer follows the drill bit through the pilot bore to enlarge the diameter of the wellbore as the BHA advances into the formation.

As the wellbore is drilled, axial force or weight is applied to the drill bit and the reamer from the surface via the drill string which causes the cutting tools to advance into the formation. This force is generally referred to as the "weight-on-bit" (WOB) and the "weight-on-reamer" (WOR). Efficient drilling with both the bit and the reamer can significantly affect performance and rate of penetration (ROP) into the formation. However, managing the WOB and the WOR when they are simultaneously used can be very difficult. There may be several scenarios that can impede drilling efficiency, thereby achieving not only low ROP but also premature wear on the downhole tools. For instance, a wellbore may extend through different formations or layers of geological material, and each formation may exhibit different physical properties. Some formations may be relatively soft and are easily drilled through, while others are relatively hard and difficult to drill through. As the wellbore advances through a relatively hard formation and into an underlying softer formation, the drill bit will quickly remove material from the softer formation while the reamer continues to more slowly ream out the wellbore in the harder formation. Consequently, the ratio between WOB and WOR may become undesirably and unevenly distributed between the reamer and the drill bit.

The imbalance in the weight distribution can also result in vibration generation in the drill string. If the weight is higher on the reamer than on the drill bit, for instance, there can be free hanging pipe mass below the reamer proximate the drill bit, thereby potentially causing severe vibration in the drill string. An imbalanced force on the bit and the reamer may also result in phase reversal of the excitation forces and excessive vibration. For example, although the drill string may be oscillating at a particular frequency, imbalanced weight between the bit and the reamer may cause each cutting structure to rotate at different phases. And when the phases of the drill bit and the reamer are significantly out of sync, excitation forces at each cutting structure are enhanced and the resulting vibration may adversely affect ROP and potentially damage vital components of the BHA.

SUMMARY OF THE DISCLOSURE

The present disclosure relates to drilling wellbores in subterranean formations and, more particularly, to systems and methods of balancing weight and hydraulic energy distribution between individual downhole cutting tools.

In some embodiments, a bottom-hole assembly is disclosed and may include a first sensor sub configured to monitor one or more operational parameters corresponding to a drill bit, a second sensor sub axially-offset from the first sensor sub and configured to monitor one or more operational parameters of a reamer, and a communications module communicably coupled to the first and second sensor subs and configured to communicate one or more corrective action signals when the one or more operational parameters of the drill bit and the reamer surpass a predetermined operating threshold.

In other embodiments, a method of drilling a wellbore is disclosed. The method may include monitoring a drill bit operational parameter with a first sensor sub arranged proximate to a drill bit, the drill bit being arranged at a distal end of a bottom-hole assembly, monitoring a reamer operational parameter with a second sensor sub arranged proximate to a reamer, the reamer being axially-offset from the drill bit by a separation distance along the bottom-hole assembly and angularly offset from the drill bit by a phase angle, receiving the drill bit and reamer operational parameters with a communications module communicably coupled to both the first and second sensor subs, and adjusting at least one of the separation distance and the phase angle when the drill bit and reamer operational parameters surpass a predetermined operating threshold.

In yet another embodiment, another method of drilling a wellbore is disclosed. The method may include monitoring a weight-on-bit with a first sensor sub arranged proximate to a drill bit, the drill bit being arranged at a distal end of a bottom-hole assembly, monitoring a weight-on-reamer with a second sensor sub arranged proximate to a reamer, the reamer being axially-offset from the drill bit along the bottom-hole assembly, receiving signals representative of the weight-on-bit and the weight-on-reamer with a communications module communicably coupled to both the first and second sensor subs, communicating one or more corrective action signals when the weight-on-bit and weight-on-reamer surpass a predetermined operating threshold, and balancing a weight distribution between the weight-on-bit and the weight-on-reamer.

The features of the present disclosure will be readily apparent to those skilled in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

FIG. 1 is an elevational view of an exemplary bottom hole assembly lowered into a representative wellbore, according to one or more embodiments.

FIG. 2 is a partial cross-sectional view of an exemplary hydraulic sub, according to one or more embodiments.

DETAILED DESCRIPTION

Figure 3A:
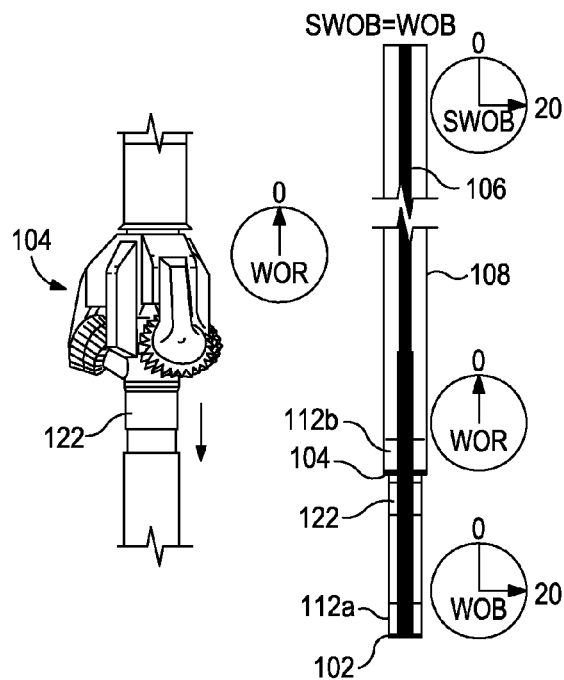
FIGS. 3A and 3B are schematic diagrams illustrating a scenario where the weight on the bit and the weight on the reamer are equalized after detecting a ratio that surpasses a predetermined operating limit, according to one or more embodiments.

The present disclosure relates to drilling wellbores in subterranean formations and, more particularly, to systems and methods of balancing weight and hydraulic energy distribution between individual downhole cutting tools.

Drilling ultra extended reach wells and extending the reach to a greater depth requires both improved models and comprehensive analysis of the drilling operations. Drilling efficiency is an important issue for ultra-long wells, and optimizing and monitoring the operational efficiency of the various cutting tools is important for successful completion of the wells. The embodiments disclosed herein may prove advantageous in monitoring drilling operations downhole in real-time and effectively managing the weight distribution between axially adjacent cutting tools arranged on a drill string. By managing the weight distribution, the drilling system will enjoy an increased rate of penetration and efficiency. Embodiments disclosed herein may also prove advantageous in remedying the adverse affects of phase imbalance between the axially adjacent cutting tools. By manipulating the cutting tools such that they are cutting substantially in phase with each other, the detrimental effects of vibration will be minimized.

FIG. 1 is an elevational view of an exemplary bottom hole assembly (BHA) 100 as lowered into a representative wellbore 108, according to one or more embodiments. As illustrated, the BHA 100 may include a drill bit 102 and a reamer 104 axially spaced along a drill string 106 that extends from a surface (not shown). The drill bit 102 and reamer 104 may be configured to drill or otherwise cut a wellbore 108 into a subterranean formation 110 for the purposes of extracting hydrocarbons therefrom. As the drill string 106 advances the BHA 100 into the subterranean formation 110, the drill bit 102 may form the wellbore 108 at a first diameter, and the reamer 104 may follow behind the drill bit 102 to expand the size of the wellbore to a second diameter, where the second diameter is greater than the first diameter. The BHA 100 may be rotated within the wellbore by, for example, rotating the drill string 106 from the surface. In other embodiments, however, a downhole motor or mud pump (not shown) may equally be used to rotate the BHA 100, without departing from the scope of the disclosure.

While not specifically illustrated, those skilled in the art will readily appreciate that the BHA 100 may further include various other types of drilling tools or components such as, but not limited to, a steering unit, one or more stabilizers, one or more mechanics and dynamics tools, one or more drill collars, one or more accelerometers, one or more jars, and one or more heavy weight drill pipe segments.

The BHA 100 may further include a first sensor sub 112a and a second sensor sub 112b coupled to or otherwise forming part of the drill string 106. The first sensor sub 112a may be arranged adjacent or otherwise proximate to the drill bit 102, and the second sensor sub 112b may be arranged adjacent or otherwise proximate to the reamer 104. The first and second sensor subs 112a,b may be configured to monitor various operational parameters in the downhole environment with respect to the BHA 100. For instance, the first sensor sub 112a may be configured to monitor operational parameters corresponding to the drill bit 102 such as, but not limited to, weight-on-bit (WOB), torque-on-bit (TOB), rotations per minute (RPM) of the drill bit 102, bending moment of the drill string 106 adjacent the drill bit 102, vibration at or near the drill bit 102, and the like. Similarly, the second sensor sub 112b may be configured to monitor operational parameters of the reamer 104 such as, but not limited to, weight-on-reamer (WOR), torque-on-reamer (TOR), rotations per minute (RPM) of the reamer 104, bending moment of the drill string adjacent the reamer 104, vibration at or near the reamer 104, and the like.

In some embodiments, one or both of the first and second sensor subs 112a,b may be a DRILLDOC® tool commercially-available from Sperry Drilling of Houston, Tex., USA. The DRILLDOC® tool, or type of sensor sub 112a,b, may be configured to provide real-time measurements of weight, torque and bending on the adjacent cutting tool (i.e., drill bit 102 and reamer 104) to characterize the transfer of energy from the surface to the cutting tool. As will be appreciated, these measurements help optimize drilling parameters to maximize performance and minimize wasted energy transfer and vibration.

The BHA 100 may further include a bi-directional communications module 114 coupled to or otherwise forming part of the drill string 106. The communications module 114 may be communicably coupled to each of the first and second sensor subs 112a,b via one or more communication lines 116 such that the communications module 114 may be configured to send and receive data to/from the first and second sensor subs 112a,b in real time. Accordingly, the communications module 114 may be provided with real time operational parameters of both the drill bit 102 and the reamer 104 during drilling operations.

In some embodiments, the communications module 114 may include one or more microprocessors 118, such as a closed feedback enabling microprocessor, or the like. The microprocessor 118 may be configured to enable the first and second sensor subs 112a,b to communicate with each other. As a result, the first sensor sub 112a may be apprised of the general operating conditions of the reamer 104 in real time by communicating with the second sensor sub 112b, and the second sensor sub 112b may likewise be apprised of the general operating conditions of the drill bit 102 in real time by communicating with the first sensor sub 112a.

The communications module 114 may further be communicably coupled to the surface (not shown) via one or more communication lines 120 such that the communications module 114 may be able to send and receive data in real time to/from the surface during operation. For instance, the communications module 114 may be configured to communicate to the surface various downhole operational parameter data as acquired via the first and second sensor subs 112a,b. Once received at the surface, an operator may consider the monitored operational parameter data and, if necessary, undertake one or more corrective actions or the like in response. In some embodiments, as described in greater detail below, the one or more corrective actions may include sending one or more command signals or corrective action signals back downhole to the communications module 114 which initiates action on the part of either the drill bit 102 or the reamer 104.

In other embodiments, however, the communications module 114 may communicate with a computerized system (not shown) or the like configured to receive the various downhole operational parameter data as acquired through the first and second sensor subs 112a,b. As will be appreciated, such a computerized system may be arranged either downhole or at the surface. In some embodiments, for example, the communications module 114 itself may serve as the computerized system as described herein. When the downhole operational parameter data surpasses or otherwise breaches one or more predetermined limits of operation, the computerized system may be configured to alert an operator or user to the operational anomaly and, in response, one or more corrective command signals may be sent to the BHA 100 in order to alter the downhole operational conditions to bring the operational parameters back into a safe or efficient operating range. In other embodiments, upon recognizing or otherwise determining a breach or surpassing of the predetermined limit of operation, the computerized system may be configured to automatically send the one or more corrective action signals to the BHA 100, without departing from the scope of the disclosure. Accordingly, the one or more corrective actions may be fully automated, in at least one embodiment.

In yet other embodiments, however, the downhole operational parameter data received by the communications module 114 as acquired through the first and second sensor subs 112a,b may instead be stored in an on-board memory (not shown) arranged in the communications module 114. When stored in the on-board memory, the collected downhole operational parameter data may be converted to depth-based log so that it may be used for post analysis when the BHA 100 is returned to the surface and a technician is able to access the on-board memory and download its contents.

As will be appreciated, the communication lines 116, 120 may be any type of wired or wireless telecommunications devices or means known to those skilled in the art such as, but not limited to, electric wires or lines, fiber optic lines, downhole telemetry techniques (mud pulse, acoustic, electromagnetic frequency, etc.), combinations thereof and the like. In some embodiments, the communications lines 116, 120 may form part of a wired drill pipe system which uses electrical wires to transmit electrical signals to and from the surface.

One of the operational parameters that may be monitored by the first and second sensor subs 112a,b that will have a direct effect on the rate of penetration (ROP) and general efficiency of drilling systems is the WOB and the WOR. It may prove advantageous to maintain the ratio of WOR to WOB to within a predetermined or desirable range as the drill bit 102 and the reamer 104 are advanced through the subterranean formation 110, especially when passing through formations 110 of diverse geological material (e.g., from a relatively hard formation into a relatively soft formation). In some embodiments, the BHA 100 may be configured to maintain the ratio between WOR and WOB at least substantially constant, or otherwise within a predetermined limit or range of suitable operation. As a result, the ROP may be maximized, adverse vibration in the drill string 106 may be decreased, and the likelihood of premature wear on the drill bit 102, the reamer 104, and other associated downhole tools and components may be minimized.

According to one or more embodiments of the disclosure, the first and second sensor subs 112a,b may be configured to monitor and report to the communications module 114 the WOB and WOR, respectively, in order to determine a ratio between the two parameters. When the ratio between WOR/WOB exceeds a predetermined value or operational threshold, that may be an indication that one of the drill bit 102 or the reamer 104 is bearing an excessive amount of the weight in the drill string 106, thereby adversely affecting drilling efficiency and ROP. Upon detecting this condition, the communications module 114 may be configured to send a signal to the surface indicating the same. At the surface, as described above, an operator or computing system may receive and consider the signal and, if appropriate, undertake one or more corrective actions in response in order to bring the ratio between WOR/WOB back to a safe or suitable operating range.

In some embodiments, an appropriate corrective action may include adjusting the slack off weight applied to the drill string 106 from the surface. Adjusting the slack off or pick up weight may be configured to reduce the weight borne by the overburdened cutting tool (i.e., drill bit 102 or reamer 104). face.

According to other embodiments of the disclosure, the ratio between WOR/WOB may be adjusted or otherwise modified by manipulating the axial position of the reamer 104 along the length of the drill string 106 with respect to the drill bit 102. For instance, as illustrated, the BHA 100 may further include a hydraulic sub 122 operatively coupled to or otherwise attached to the reamer 104. In some embodiments, the hydraulic sub 122 may be coupled to the downhole end of the reamer 104 (i.e., below the reamer 104), as illustrated. In other embodiments, however, the hydraulic sub 122 may be coupled to the uphole end of the reamer 104 (i.e., above the reamer 104), without departing from the scope of the disclosure. In any event, the hydraulic sub 122 may form an integral part of the drill string 106 and BHA 100 as operatively coupled to the reamer 104.

The hydraulic sub 122 may be communicably coupled to the communications module 114 via the communications line 116. The communications module 114 may be configured to send one or more corrective action signals to the hydraulic sub 122 in order to actuate the hydraulic sub 122, and thereby manipulate the axial position of the reamer 104 along the length of the drill string 106 with respect to the drill bit 102.

Referring to FIG. 2, illustrated is a partial cross-sectional view of an exemplary hydraulic sub 122, according to one or more embodiments. It should be noted that the hydraulic sub 122 is depicted for illustrative purposes only, and therefore should not be considered limiting to the scope of the disclosure. For instance, those skilled in the art will readily recognize that there are several other types of devices or machines that may operate similar to the hydraulic sub 122, as described herein, and may equally be used without departing from the scope of the disclosure. The hydraulic sub 122 may include a generally elongate body 202 having a box end 204*a* and a pin end 204*b*. The body 202 may be substantially cylindrical in shape, but in other embodiments may be formed in any other suitable geometric shape, without departing from the scope of the disclosure. In some embodiments, the box end 204*a* of the body 202 may be operatively coupled to the reamer 104 (FIG. 1), such as through a threaded engagement (not shown). The pin end 204*b* may be operatively coupled to the drill string 106 and, as discussed more below, a sleeve 205 may be threaded or otherwise attached to the body 202 at the pin end 204*b* and arranged generally within the drill string 106.

In the illustrated exemplary embodiment, the hydraulic sub 122 may include a piston 206, a pressure chamber 208, a biasing device 210, and a fluid inlet 212. The piston 206 may be movably arranged within the body 202 and configured to reciprocate axially in and out of the body 202 and the sleeve 205. As the piston 206 reciprocates, the axial length of the hydraulic sub 122 and drill string 106 may correspondingly increase or decrease, thereby manipulating the axial position of the reamer 104 (FIG. 1) with respect to the drill bit 102 (FIG. 1) arranged at the end of the drill string 106. In some embodiments, for example, the sleeve 205 may be a sliding sleeve assembly that allows the piston 206 to bias an internal drill string 106 component or device (not shown) and thereby gain the necessary leverage to raise or lower the reamer 104. For instance, when the body 202 is in contact with the piston 206 the axial load may be transferred to the reamer 104. The magnitude of such force is proportional to the amount of slack off at the surface.

The piston 206 may be actuated or otherwise activated by pressurizing the pressure chamber 208. The pressure chamber 208 may be defined within the body 202 and in fluid communication with the fluid inlet 212 via one or more conduits 214, for example. The fluid inlet 212 may be configured to inject a fluid, such as a hydraulic fluid, into the pressure chamber 208 in order to pressurize the pressure chamber 208. Pressurizing the pressure chamber 208 may force the piston 206 in the direction A, thereby increasing the axial length of the hydraulic sub 122. Upon decreasing otherwise eliminating the fluid pressure in the pressure chamber 208, the biasing device 210 may be configured to retract the piston 206 back into the body 202 in the direction B, thereby contracting the axial length of the hydraulic sub 122.

In some embodiments, the biasing device 210 may be a spring, such as a coil spring, and moving the piston 206 in direction A may simultaneously expand the spring and thereby build up spring energy that may be used to retract the piston 206 back into the body 202. In other embodiments, however, the biasing device 210 may be any other suitable mechanical or electrical device such as, but not limited to, an electromechanical actuator, a piston and cylinder assembly, a solenoid assembly, a motor, combinations thereof, and the like.

Accordingly, the hydraulic sub 122 may operate to supply a hydraulic force that acts on the reamer 104 to either push it uphole or effectively pull it downhole by removing WOB, and thereby adjust the WOR as detected by the second sensor sub 112*b*. Depending on the magnitude of force distribution between the WOB and the WOR, as monitored and reported by the first and second sensor subs 112*a,b*, the hydraulic sub 122 may be actuated either up or down so that the WOR exerted by the reamer 104 on the formation 110 is in sync with the drill bit 102 and otherwise not surpassing a predetermined threshold of optimal drilling operation.

Figure 3B:
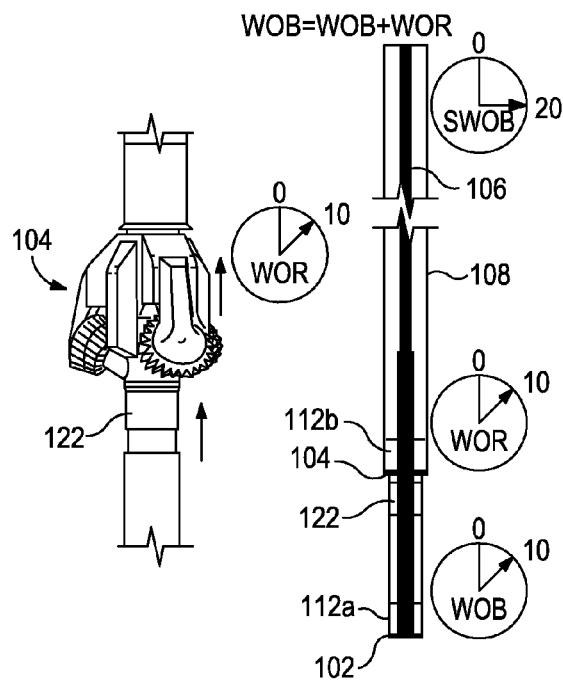

There may be several different scenarios when the hydraulic sub 122 may prove advantageous in balancing the WOR with respect to the WOB. For example, referring now to FIGS. 3A and 3B, illustrated are schematic diagrams showing a scenario where the WOB and WOR are equalized after detecting a ratio of WOB/WOR that surpasses a predetermined operating limit, according to one or more embodiments. As illustrated in FIG. 3A, the weight on the drill string 106 as measured at the surface (i.e., "SWOB") may be equal or substantially equal to the WOB as measured by the first sensor sub 112*a*, e.g., SWOB=WOB=20 kips. As a result, the WOR is zero or close to zero. In such a case, there is little or no load transfer to the reamer 104 and, therefore, little or no cutting force at the reamer 104 which may result in decreased ROP and unwanted vibration in the drill string 106.

In order to balance the WOB with respect to the WOR, the hydraulic sub 122 may be used, as discussed above. As shown in FIG. 3B, the hydraulic sub 122 is actuated or otherwise the piston 206 is retracted such that an axial force of about 10 kips is applied to the reamer 104 on the formation 110 (FIG. 1), as measured by the second sensor sub 112*b*, and thereby decreasing the WOB by about 10 kips, as measured by the first sensor sub 112*a*. Actuation of the hydraulic sub 122 may cease when the first and second sensor subs 112*a,b* report to the communications module 114 (FIG. 1) that the load between the reamer 104 and the drill bit 102 is balanced such that SWOB is substantially equal (or otherwise within a predetermined range of suitable operation) to the WOB plus the WOR, e.g., WOB 10 kips+WOR 10 kips=SWOB 20 kips.

Figure 4A:
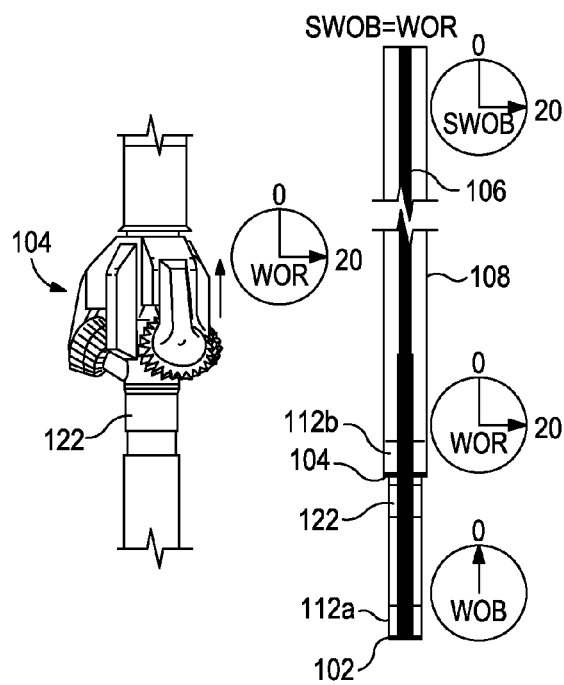
FIGS. 4A and 4B are schematic diagrams illustrating another scenario where the weight on the bit and the weight on the reamer are equalized after detecting a ratio that surpasses a predetermined operating limit, according to one or more embodiments.
Figure 4B:
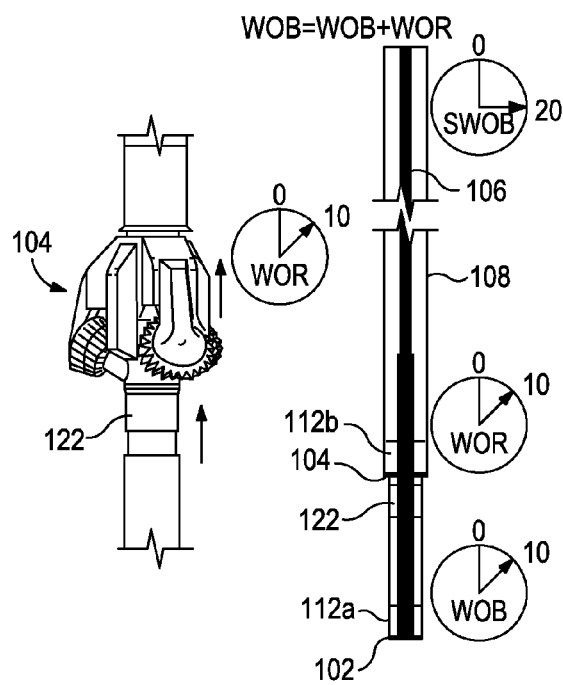

Referring to FIGS. 4A and 4B, illustrated are schematic diagrams showing another scenario where the WOB and WOR are equalized after detecting a ratio of WOB/WOR that surpasses a predetermined operating limit, according to one or more embodiments. As illustrated in FIG. 4A, the weight measured at the surface SWOB may be equal or substantially equal to the WOR, as measured by the second sensor sub 112*b*, e.g., SWOB=WOR=20 kips. As a result, the WOB is zero or close to zero. In such a case, there is little or no load transfer to the drill bit 102 and, therefore, the full cutting action is transferred from the drill bit 102 to the reamer 104.

As shown in FIG. 4B, this condition is sensed with the first and second sensor subs 112*a,b*, and, in corrective response, the hydraulic sub 122 is actuated or otherwise the piston 206 is expanded (e.g., extended) such that weight on reamer 104 is effectively removed therefrom and transferred downhole to the drill bit 102, thereby balancing the WOB with respect to the WOR. Actuation of the hydraulic sub 122 may cease once the first and second sensor subs 112*a,b* report to the communications module 114 (FIG. 1) that the load between the reamer 104 and the drill bit 102 is balanced such that SWOB is substantially equal to the WOB plus the WOR, e.g., WOB 10 kips+WOR 10 kips=SWOB 20 kips.

As will be appreciated, in scenarios where the SWOB is equal to the WOB plus the WOR, the weight is balanced at both ends of the drill string 106 and, therefore, no action is required or needed by the hydraulic sub 122. During drilling operations, the first and second sensor subs 112*a,b* may be continuously in communication with each other via the one or more microprocessors 118 (FIG. 1). As a result, adjustments to the WOR using the hydraulic sub 122 may be undertaken in real time, or as soon as the first and second sensor subs 112*a,b* detect a ratio between the WOB and WOR that surpasses a predetermined operational threshold limit. When an imbalance between the two is detected, the hydraulic sub 122 may be actuated (i.e., either contracted or expanded) in order to bring the two operating parameters back into balance. When the first and second sensor subs 112a,b sense that the WOB and the WOR are balanced, or otherwise their ratio is within or below the predetermined operational threshold limit, drilling may be resumed or otherwise proceed more efficiently.

Referring again to FIG. 1, the BHA 100 may further include at least one downhole propulsion system 124, according to one or more embodiments. In some embodiments, the downhole propulsion system 124 may be characterized as a downhole tractor, or the like, as generally known to those skilled in the art. For instance, in at least one embodiment, the downhole propulsion system 124 may be a tractor as described and illustrated in co-owned U.S. Pat. No. 6,863,137, the contents of which are hereby incorporated by reference in their entirety. In some embodiments, as illustrated, the propulsion system 124 may be arranged in the drill string 106, or otherwise form an integral part thereof, between the drill bit 102 and the reamer 104. In other embodiments, the propulsion system 124 may be arranged above or uphole from the reamer 104. In yet other embodiments, a second downhole propulsion system (not shown) may be arranged above the reamer 104 and configured to operate in concert with the illustrated propulsion system 124, without departing from the scope of the disclosure.

The downhole propulsion system 124 may serve several purposes including, but not limited to, thrusting or propulsion of the BHA 100 in either direction within the wellbore 108, obtaining and reporting resistivity measurements of the surrounding formation 110, steering the BHA 100 towards a pay zone, and generally generating the borehole trajectory. In some embodiments, however, the propulsion system 124 may further be used or otherwise configured to balance the weight distribution between the drill bit 102 and the reamer 104, similar to the purpose of the above-described hydraulic sub 122.

To accomplish appropriate weight distribution and/or balance, the propulsion system 124 may include one or more traction modules 126 (three shown as 126a, 126b, and 126c) which may be radially expanded and/or contracted in order to strategically engage and release the wall of the wellbore 108. While three traction modules 126 are illustrated in FIG. 1, it should be appreciated that the propulsion system 124 may include more or less than three traction modules 126, without departing from the scope of the disclosure. Moreover, the traction modules 126 may be of any type known to those skilled in the art, including, but not limited to, wheeled-type, crawler-type, mechanical-type (e.g., retractable pads), combinations thereof, and the like.

While not shown, the propulsion system 124 may further include various internal components, such as hydraulic assemblies, shafts, solenoids, pistons, and the like, designed to expand and contract the traction modules 126, but also strategically expand and contract the axial length of the propulsion system 124 itself. A full description of the internal components and workings of the exemplary propulsion system 124 is beyond the scope of this disclosure, and therefore will not be described in detail. Moreover, while a particular design for the propulsion system 124 is generally depicted and described with reference to FIG. 1, it will be appreciated that several other types and/or designs of propulsion systems 124 (i.e., downhole tractors) may be equally applicable or otherwise suitably employed in the BHA 100, without departing from the scope of the disclosure. Consequently, the propulsion system 124 is depicted and described herein for illustrative purposes only and should not be considered limiting to the disclosure.

The propulsion system 124 may be communicably coupled to the communications module 114 via the communications line 116. When a weight imbalance between the drill bit 102 and the reamer 104 is detected by the first and second sensor subs 112a,b, the communications module 114 may be configured to send one or more corrective action signals to the propulsion system 124 in order to remedy the inordinate imbalance. Specifically, the propulsion system 124 may be actuated in an effort to bring the ratio between WOR/WOB back to within a predetermined range of suitable operation. By having two or more points of contact on the wellbore 108 walls via the traction modules 126, the propulsion system 124 may be able to manipulate the axial position of each cutting tool (i.e., drill bit 102 and reamer 104) with respect to each other. As will be appreciated, this may have the effect of increasing or lessening the weight assumed or otherwise borne by each cutting tool.

In some embodiments, for example, an excessive amount of drill string 106 weight may be assumed at the drill bit 102 such that there is little or no load transfer to the reamer 104 and, therefore, little or no cutting force at the reamer 104. Such a scenario is illustrated in FIG. 3A. In such cases, the propulsion system 124 may be actuated to remedy this inordinate imbalance. For instance, the downhole traction module 126b may be actuated to grippingly engage the wall of the wellbore 108 while the uphole traction module 126a may be radially contracted. With the downhole traction module 126b expanded and the uphole traction module 126a contracted, the propulsion system 124 may be contracted axially, thereby placing additional weight on the reamer 104 above and simultaneously balancing the weight distribution between the drill bit 102 and the reamer 104. Alternatively, the uphole traction module 126a may grippingly engage the walls of the wellbore 108, the downhole traction module 126b may be retracted, and the propulsion system 124 may axially contract to reduce the amount of drill string 126 weight applied on the drill bit 102, thereby also balancing the weight distribution between the drill bit 102 and the reamer 104.

In other embodiments, an excessive amount of drill string 106 weight may be applied at the reamer 104 such that there is little or no load transfer to the drill bit 102 and, therefore, little or no cutting force at the drill bit 102. Such a scenario is illustrated in FIG. 4A. In such cases, the downhole traction module 126b may be actuated to grippingly engage the wall of the wellbore 108, the uphole traction module 126a may be contracted, and the propulsion system 124 may be expanded axially, thereby reducing drill string 126 weight on the reamer 104 above, and thereby balancing the weight distribution between the drill bit 102 and the reamer 104. Alternatively, the uphole traction module 126a may grippingly engage the walls of the wellbore 108, the downhole traction module 126b may be retracted, and the propulsion system 124 may axially expand to increase the amount of drill string 126 weight applied on the drill bit 102, thereby also balancing the weight distribution between the drill bit 102 and the reamer 104.

With real time measurements of WOB and WOR being provided by the first and second sensor subs 112a,b, respectively, the propulsion system 124 may be configured to expand or contract in order to constantly function or operate to maintain a suitable operational balance between the WOB and WOR. The third or middle traction module 126c may be used in conjunction with the uphole and downhole traction modules 126a,b when needed, especially in cases where the walls of the wellbore fluctuate and the uphole or downhole traction module 126a,b are otherwise unable to adequately engage the wellbore 108. In such cases, the middle traction module 126c may be actuated and used in concert with or otherwise in place of either the uphole or downhole traction modules 126a,b.

Those skilled in the art will readily appreciate the several different configurations that the traction modules 126 may assume in order to balance the load on each cutting tool (i.e., drill bit 102 and reamer 104). Via communication with the communications module 114, an operator at the surface may be able to control such configurations (i.e., sending one or more corrective action signals or commands) and the first and second sensor subs 112a,b may provide real time monitoring of such actions. In other embodiments, the computerized system, as described above, may be configured to receive the various downhole operational parameter data as acquired through the first and second sensor subs 112a,b and, upon recognizing a breach of the predetermined limit of suitable operation, may be configured to automatically send the one or more corrective action signals to the BHA 100 and the propulsion system 124, without departing from the scope of the disclosure.

Still referring to FIG. 1, during drilling operations, the excitation energy (e.g., vibration) generated by the drill bit 102 and the reamer 104, respectively, may or may not be the same. An imbalanced force or weight applied to the drill bit 102 and the reamer 104 may result in a phase shift or phase reversal between the two cutting tools. For instance, as the drill string 106 rotates within the wellbore 108, the drill bit 102 and the reamer 104 rotate therewith at essentially the same speed (i.e., rotations per minute). However, the drill bit 102 may be oscillating within the wellbore 108 at a first frequency and the reamer 104 may be oscillating at a second frequency. In some cases, the first and second frequencies may be the same but the drill bit 102 and the reamer 104 may nonetheless be oscillating out of phase with each other. Such phase imbalances between the drill bit 102 and the reamer 104 can generate incident vibration in the drill string 106 that may affect drilling efficiency or otherwise damage downhole tools and components.

The phase or phase angle for each of the drill bit 102 and the reamer 104 provides its corresponding angular position in the drill string 106 with reference to the wellbore 108. For example, if the two excitation forces or displacements of the cutting tools are 90° out of phase, then one excitation force is at a maximum level and the other excitation force will be at or near zero. If the two excitation forces are 180° out of phase, then one excitation force is at a positive maximum and the other excitation force will be at its negative maximum. In some drilling applications, the excitation response at the drill bit 102 may be in phase with the excitation response at the reamer 104. In other drilling applications, however, the excitation response at the reamer 104 may either lag or lead the excitation response at the drill bit 102, thereby resulting in unwanted vibrations in the drill string 106.

In order to bring the phases back into alignment or otherwise place the drill bit 102 and the reamer 104 back into angular uniformity, the BHA 100 may be configured to adjust the phase angle between the drill bit 102 and the reamer 104. To accomplish this, the BHA 100 may further include a phase shift sub 128 coupled to or otherwise forming an integral part of the drill string 106, as depicted in FIG. 1. While the hydraulic sub 122 is shown interposing the phase shift sub 128 and the reamer 104, in at least one embodiment, the hydraulic sub 122 may be omitted from the BHA 100 and the phase shift sub 128 may instead be operatively coupled to or otherwise attached to the reamer 104. In the illustrated embodiment, however, the phase shift sub 128 may be configured to operate in conjunction with the hydraulic sub 122. In yet other embodiments, the hydraulic sub 122 and the phase shift sub 128 may be combined into a single sub component of the BHA 100. In even further embodiments, the axial position of the hydraulic sub 122 and the phase shift sub 128 may be reversed, such that the phase shift sub 128 is operatively coupled to the reamer 104 and the hydraulic sub 122 is operatively coupled to the phase shift sub 128 at its downhole end.

The phase shift sub 128 may be communicably coupled to the communications module 114 via the communications line 116. Upon sensing or otherwise detecting a torque imbalance between the drill bit 102 and the reamer 104, the communications module 114 may be configured to send one or more corrective action signals to the phase shift sub 128 in order to alter the phase angle between the drill bit 102 and the reamer 104. In other embodiments, wellbore operational parameters that may be indicative of a phase shift between the drill bit 102 and the reamer 104 may include vibration and an azimuth angle of each cutting tool as centered around a common reference point in the drill string 106. Upon sensing such wellbore operational parameters with the first and second sensor subs 112a,b, the communications module 114 may again be configured to send one or more corrective action signals to the phase shift sub 128 in order to alter the phase angle between the two cutting tools.

Figure 5:
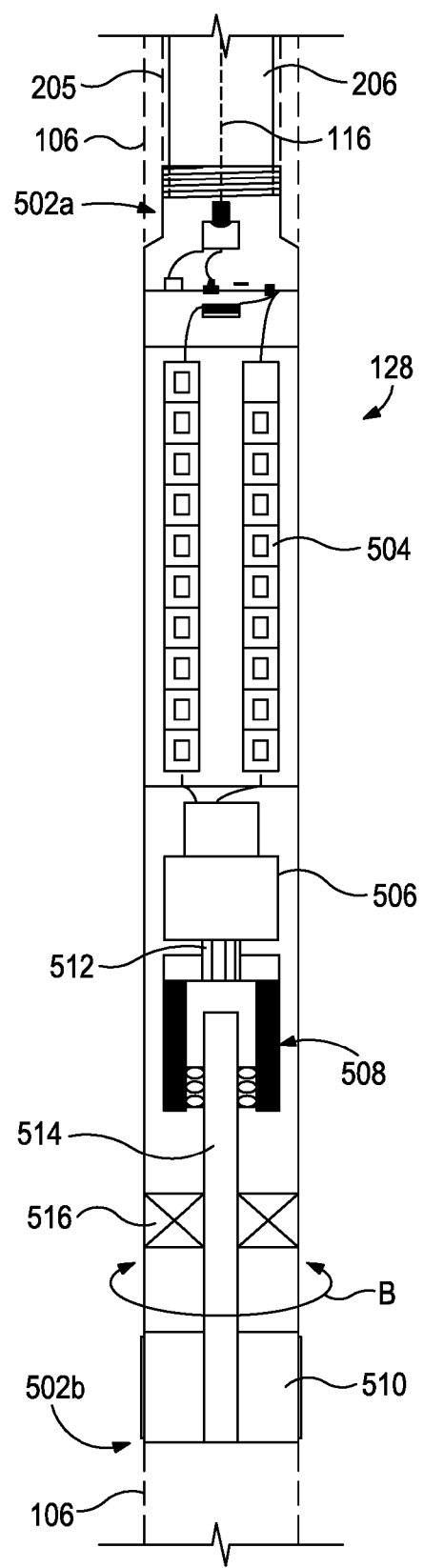
FIG. 5 is a partial cross-sectional view of an exemplary phase shift manipulator, according to one or more embodiments.

Referring to FIG. 5, illustrated is a partial cross-sectional view of an exemplary phase shift sub 128, according to one or more embodiments. It should be noted that the phase shift sub 128 is depicted for illustrative purposes only, and therefore should not be considered limiting to the scope of the disclosure. Those skilled in the art will readily recognize that there are several other types of devices or machines that may operate similar to the phase shift sub 128, as described herein, and may equally be used without departing from the scope of the disclosure.

As illustrated, the phase shift sub 128 may have a pin end 502a and a box end 502b. The pin end 502a may coupled to the drill string 106, such as the portion of the drill string 106 extending down from the hydraulic sub 122, as depicted in FIG. 2. The box end 502b may also be coupled to the drill string 106 and, in some embodiments, may be rotatably coupled thereto, as described below. The pin end 502a may further be operatively coupled to the sleeve 205, as shown extending down from the hydraulic sub 122 in FIG. 2. Moreover, in some embodiments, the piston 206 may be operatively coupled to the phase shift sub 128 at the pin end 502a. As depicted, the piston 206 may be threadably attached to the pin end 502a such that axial movement of the piston 206, as described above, may also serve to axially move the phase shift sub 128. In other embodiments, however, the piston 206 may be coupled or otherwise attached to the pin end 502a using any other attachment mechanism such as, but not limited to, welding or brazing techniques, industrial adhesives, mechanical fasteners, combinations thereof, and the like.

The phase shift sub 128 may also include a motor 504, a phase shift module 506, a torque assembly 508, and a rotatable coupling 510. The motor 504 may be operatively coupled to the phase shift module 506 and, when actuated, may be configured to incrementally rotate the torque assembly 508. The motor 504 may be configured for rotation in either angular direction, depending on the required phase shift between the drill bit 102 and the reamer 104.

In some embodiments, the phase shift module 506 may include a splined engagement mechanism 512 configured to matingly engage an upper portion of the torque assembly 508. Consequently, as the phase shift module 506 rotates, the rotational force may be transferred to the torque assembly 508 via the splined engagement mechanism 512. The torque assembly 508 may include a torque rod 514 rotatably mounted within the phase shift sub 128 and centered therein using one or more radial bearings 516. The torque rod 514 may extend within the phase shift sub 128 and may be coupled or otherwise attached to the rotatable coupling 510 at its distal end. In operation, as the phase shift module 506 rotates, the rotational force may be transferred to the torque assembly 508 which transfers the rotational force to the rotatable coupling 510. The rotatable coupling 510 may be able to rotate with respect to the phase shift module 506 and, as coupled or otherwise attached to the drill string 106 therebelow, may be configured to transfer the rotational force to the drill string 106. As will be appreciated, rotating the drill string 106 therebelow, may result in adjusting the phase shift or phase angle between the drill bit 102 and the reamer 104.

Referring again to FIG. 1, with continued reference to FIG. 5, in exemplary operation, the first sensor sub 112a may be configured to monitor or otherwise detect the torque-on-bit (TOB) and the second sensor sub 112b may be configured to monitor or otherwise detect the torque-on-reamer (TOR), and each may be configured to convey such operational parameter data to the communications module 114. When the TOB and the TOR are different or otherwise measured as outside of a predetermined safe range of operation, that may be indicative of a phase angle difference between the drill bit 102 and the reamer 104. Such a determination may equally be surmised or otherwise supplemented by detecting excessive vibration at one or both the drill bit 102 and reamer 104, as reported by the first and second sensor subs 112a,b, respectively.

Upon determining that one or both of the TOB or TOR has surpassed a predetermined limit of suitable operation, the communications module 114 may be configured to send a corrective action signal to the phase shift sub 128. The phase shift sub 128 may actuate the motor 504, and thereby rotatably drive the phase shift module 506, the torque assembly 508, the rotatable coupling 510, and the drill string 106 therebelow, as generally described above. The motor 504 may be configured to incrementally rotate in either angular direction, as indicated by the arrow B, thereby being able to adjust the phase angle between the drill bit 102 and the reamer 104 whether the phase at the reamer 104 lags or leads the phase of the drill bit 102. If the reamer 104 is lagging, for example, forward rotation may be applied so that the reamer 104 returns to an angular rotation that is in phase with the drill bit 102, and vice versa. Once the first and second sensor subs 112a,b report to the communications module 114 that TOB and TOR has been substantially balanced, or that the vibration caused by the out of phase operation has been reduced, the motor 504 may cease operation and drilling may continue.

Again, it should be noted that the phase shift sub 128, and its various components as described herein, are shown for illustrative purposes only and therefore should not be considered limiting of the present disclosure. Instead, those skilled in the art will readily recognize that other designs may equally be employed to adjust the phase shift or phase angle between the two cutting tools, without departing from the scope of the disclosure. Moreover, it is also noted that the phase shift sub 128 and its various components as described herein are not necessarily drawn to scale.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A bottom-hole assembly, comprising:
a first sensor sub arranged proximate to a drill bit to monitor one or more operational parameters corresponding to the drill bit;
a second sensor sub axially-offset from the first sensor sub and arranged proximate to a reamer to monitor one or more operational parameters of the reamer;
a communications module communicably coupled to the first and second sensor subs to communicate one or more corrective action signals when the one or more operational parameters of the drill bit and the reamer surpass a predetermined operating threshold: and
one of a hydraulic sub and a downhole propulsion system positioned between the drill bit and the reamer and communicably coupled to the communications module to receive the one or more corrective action signals and actuate in response thereto to balance a weight distribution between the drill bit and the reamer.

2. The bottom-hole assembly of claim 1, wherein the one or more operational parameters of the drill bit comprises weight-on-bit and the one or more operational parameters of the reamer comprises weight-on-reamer.

3. The bottom-hole assembly of claim 2, wherein the hydraulic sub is actuatable to adjust a separation distance of the reamer and the drill bit in order to balance the weight distribution between the weight-on-bit and the weight-on-reamer.

4. The bottom-hole assembly of claim 1, wherein the downhole propulsion system is actuatable to axially expand or contract to balance the weight distribution between the weight-on-bit and the weight-on-reamer.

5. The bottom-hole assembly of claim 1, wherein the one or more operational parameters of the drill bit comprises torque-on-bit and the one or more operational parameters of the reamer comprises torque-on-reamer.

6. The bottom-hole assembly of claim 5, further comprising a phase shift sub communicably coupled to the communications module and configured to receive the one or more corrective action signals and alter a phase angle between the drill bit and the reamer.

7. The bottom-hole assembly of claim 6, wherein the phase shift sub is operatively coupled between the reamer and the drill bit.

8. A method of drilling a wellbore, comprising:
monitoring a drill bit operational parameter with a first sensor sub arranged proximate to a drill bit arranged at a distal end of a bottom-hole assembly;
monitoring a reamer operational parameter with a second sensor sub arranged proximate to a reamer axially-offset from the drill bit by a separation distance along the bottom-hole assembly and angularly offset from the drill bit by a phase angle;
receiving the drill bit and reamer operational parameters with a communications module communicably coupled to both the first and second sensor subs;
communicating one or more corrective action signals from the communications module when the drill bit and reamer operational parameters surpass a predetermined operating threshold: and
actuating one of a hydraulic sub and a downhole propulsion system communicably coupled to the communications module in response to receiving the one or more corrective action signals and thereby adjusting the separation distance, wherein the one of a hydraulic sub and a downhole propulsion system are positioned between the drill bit and the reamer.

9. The method of claim 8, wherein the drill bit operational parameter comprises a weight-on-bit and the reamer operational parameter comprises a weight-on-reamer, the method further comprising
increasing or decreasing the separation distance with the hydraulic sub to balance a weight distribution between the weight-on-bit and the weight-on-reamer.

10. The method of claim 8, wherein the drill bit operational parameter comprises a weight-on-bit and the reamer operational parameter comprises a weight-on-reamer, the method further comprising
balancing a weight distribution between the weight-on-bit and the weight-on-reamer with the downhole propulsion system.

11. The method of claim 10, wherein balancing the weight distribution further comprises axially expanding or axially contracting the downhole propulsion system.

12. The method of claim 8, wherein the drill bit operational parameter comprises a torque-on-bit and the reamer operational parameter comprises a torque-on-reamer, the method further comprising:
receiving the one or more corrective action signals with a phase shift sub operatively coupled to the reamer and communicably coupled to the communications module; and
altering a phase angle between the drill bit and the reamer with the phase shift sub.

13. The method of claim 8, further comprising sending and receiving data in real time to and from a surface location, the communications module being communicably coupled to the surface location.

14. A method of drilling a wellbore, comprising:
monitoring a weight-on-bit with a first sensor sub arranged proximate to a drill bit arranged at a distal end of a bottom-hole assembly;
monitoring a weight-on-reamer with a second sensor sub arranged proximate to a reamer axially-offset from the drill bit along the bottom-hole assembly;
receiving signals representative of the weight-on-bit and the weight-on-reamer with a communications module communicably coupled to both the first and second sensor subs;
communicating one or more corrective action signals when the weight-on-bit and the weight-on-reamer surpass a predetermined operating threshold;
receiving the one or more corrective action signals with a device positioned axially between the drill bit and the reamer along the bottom-hole assembly; and
actuating the device in response to the one or more corrective action signals to balance a weight distribution between the weight-on-bit and the weight-on-reamer with the device.

15. The method of claim 14, wherein the device is a hydraulic sub operatively coupled between the reamer and the drill bit and communicably coupled to the communications module, the method further comprising:
receiving the one or more corrective action signals with the hydraulic sub; and
adjusting an axial position of the reamer relative to the drill bit with the hydraulic sub to balance a weight distribution between the weight-on-bit and the weight-on-reamer.

16. The method of claim 14, wherein the device is a downhole propulsion system arranged between the drill bit and the reamer and communicably coupled to the communications module, the method further comprising:
receiving the one or more corrective action signals with the downhole propulsion system; and
actuating the downhole propulsion system such that a separation distance between the drill bit and the reamer is adjusted.

17. The method of claim 14, further comprising:
monitoring a torque-on-bit with the first sensor sub and monitoring a torque-on-reamer with the second sensor sub;
receiving signals representative of the torque-on-bit and the torque-on-reamer with a communications module communicably coupled to both the first and second sensor subs;
communicating one or more additional corrective action signals when the torque-on-bit and the torque-on-reamer surpass a predetermined operating threshold;
receiving the one or more additional corrective action signals with a phase shift sub operatively coupled between the reamer and the drill bit and communicably coupled to the communications module; and
altering a phase angle between the drill bit and the reamer with the phase shift sub.

* * * * *